United States Patent [19]

Horike et al.

[11] 4,231,048

[45] Oct. 28, 1980

[54] INK JET RECORDING APPARATUS

[75] Inventors: Masanori Horike, Yokohama; Koichiro Jinnai, Tokyo; Kyuhachiro Iwasaki, Tokyo

[73] Assignees: Yutaka Kodama, Tokyo, all of Japan; Ricoh Co., Ltd., Japan

[21] Appl. No.: 972,325

[22] Filed: Dec. 22, 1978

[30] Foreign Application Priority Data

Dec. 29, 1977 [JP] Japan ................................ 52/160314

[51] Int. Cl.[3] ............................................ G01D 15/18

[52] U.S. Cl. .................................. 346/140 R; 346/1.1

[58] Field of Search .................................. 346/75, 140

[56] References Cited

U.S. PATENT DOCUMENTS

| | | | |
|---|---|---|---|
| 3,373,437 | 3/1968 | Sweet et al. | 346/75 |
| 3,596,275 | 7/1971 | Sweet | 346/75 X |
| 3,747,120 | 7/1973 | Stemme | 346/75 |
| 4,063,254 | 12/1977 | Fox et al. | 346/75 |

*Primary Examiner*—George H. Miller, Jr.
*Attorney, Agent, or Firm*—McGlew and Tuttle

[57] ABSTRACT

In an ink jet recording apparatus including a carriage operative to move in scanning motion for printing characters and symbols on a printing surface and supporting thereon a single printing head having a plurality of ink jet nozzles or a plurality of printing heads each having a single ink jet nozzle, the printing surface is formed as a curved surface and the printing head or heads are constructed such that ink can be ejected radially with respect to the center of curvature of the curved printing surface. The vertical spacing between dots formed by ejected ink can be adjusted by moving the printing head or heads relative to the printing surface to thereby adjust the spacing between the printing surface and the printing head or heads, and the transverse spacing between the dots can be adjusted by adjusting the scanning speed of the printing head or heads or the ink ejecting timing.

13 Claims, 6 Drawing Figures

INK JET RECORDING APPARATUS

BACKGROUND OF THE INVENTION

This invention relates to ink jet recording apparatus and more particularly to an ink jet recording apparatus of the type which is capable of adjusting the vertical and transverse spacings between dots formed by such apparatus.

In an ink jet recording apparatus having a printing head provided with a plurality of ink jet nozzles, such as a dot printer, dots are formed on a printing surface by ink ejected through the nozzles while the printing head is moved. In ink jet recording apparatus of the prior art, it has hitherto been possible to effect adjustments of the transverse spacing between the dots on the printing surface by electrically controlling the printing timing. It has also been possible to adjust the transverse spacing between the dots on the printing surface by varying the speed at which the printing head is moved in scanning motion while keeping the printing timing constant. Since it is impossible to vary the spacing between the plurality of ink ejecting nozzles of the printing head, it has hitherto been impossible to adjust the vertical spacing between the dots formed on the printing surface.

If the spacing between the dots on the printing surface is adjusted only transversely, characters and symbols formed by the dots would only have an increased width and present rather an ugly appearance. Thus a difficulty has been experienced in putting into practical use on ink jet recording apparatus of the prior art capable of adjusting the spacing between the dots, because such apparatus is unable to meet the requirement of changing the size of characters and symbols without lowering the quality of the produced characters and symbols.

There has thus been felt a need for an ink jet recording apparatus which enables the size of characters and symbols to be freely varied without in any way distorting the characters and symbols.

SUMMARY OF THE INVENTION

This invention has as its object the provision of an ink jet recording apparatus having a printing head capable of adjusting not only the transverse spacing but also the vertical spacing between dots formed on a printing surface, whereby characters and symbols formed by the apparatus can have their size varied freely.

The ink jet recording apparatus comprises printing head means supported by a carriage movable in scanning motion, the printing head means comprising a single head provided with a plurality of ink ejecting nozzles arranged on a plane parallel to the direction of scanning movement of the carriage or a plurality of heads each having a single ink ejecting nozzle and arranged on a plane parallel to the direction of scanning movement of the carriage. The ink ejecting nozzles are located such that ink can be ejected radially with respect to the center of curvature of a printing surface formed as a curved surface, and the spacing between the head means and the printing surface can be adjusted.

The nozzle means is arranged such that its forward end is located on an arc of an imaginary circle concentric with the curved printing surface or an arc similar to an arc of such imaginary circle.

DESCRIPTION OF THE PREFERRED EMBODIMENTS

In FIGS. 1 to 4, the nozzles are shown in side views at the left side of each Figure to enable the arrangement thereof to be understood, and in front view projections at the right side of each Figure.

Figure 1:
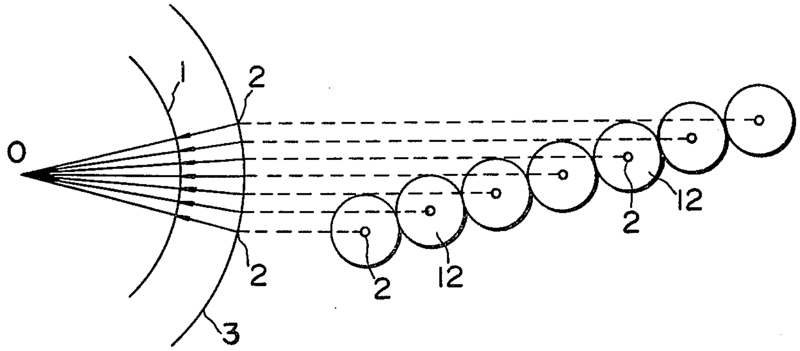
FIG. 1 is a view in explanation of one embodiment of the present invention.

In FIG. 1, seven dots are formed vertically in a column. Seven ink jet nozzles 2 for ejecting ink jets against a printing surface 1 in the form of a cylindrical surface having a center O are located on an arc 3 disposed outside the printing surface 1 whose center O is located such that the paths of flow of the ejected ink jets converge on the center O. The nozzles 2 need not be located on the arc 3 and may be located on a straight line having an infinite radius, so long as the parts of flow of the ink jets ejected from the nozzles 2 converge on the center O. The printing surface 1 may be approximate to a cylindrical surface of a large radius so long as variations in the spacing between the adjacent dots are not recognized. The seven nozzles 2 may be arranged vertically and supported by a single printing head, or each of the nozzles 2 may be supported by one of a plurality of printing heads 12 displaced both vertically and transversely and arranged obliquely, as shown on the right side of FIG. 1.

Figure 2:
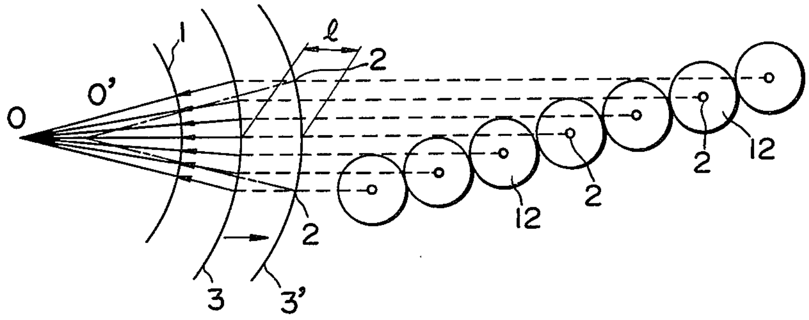
FIG. 2 is a view in explanation of a change in the spacing between dots effected by the embodiment shown in FIG. 1.

If the nozzle position 3 shown in FIG. 1 is moved to a nozzle position 3' which is farther from the printing surface 1 by a distance l than the nozzle position 3 shown in FIG. 2, the ink jets ejected from the nozzles 2 in this position 3' will converge on a center O' which is spaced from the center a distance l. At this time, the ink jets impinge on the printing surface as indicated by dash-and-dot lines, so that the dots formed in FIG. 2 have a smaller vertical spacing between them than the dots formed in FIG. 1. Conversely, if the nozzle position 3 shown in FIG. 1 is moved toward the printing surface 1, then the dots formed have a large vertical spacing.

Figure 3:
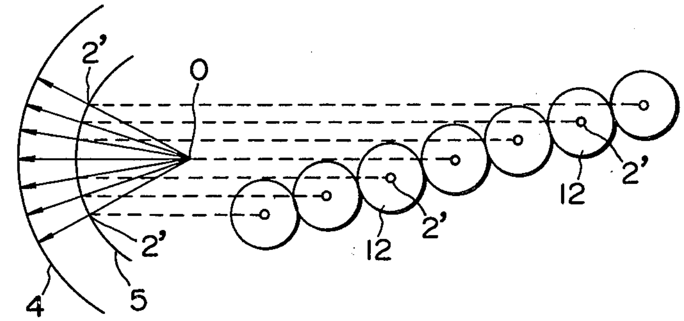
FIG. 3 is a view in explanation of another embodiment.

In FIG. 3, nozzles 2' are arranged such that the ink jets ejected therefrom diverge from the center O. In this embodiment too, the nozzles 2' may be arranged vertically and supported by a single printing head, or each of the nozzles 2' may be supported by one of a plurality of printing heads 12 arranged obliquely, as shown on the right side of FIG. 3. In this embodiment, the printing surface 4 is formed as an inner surface of a cylindrical surface having its center on a center line passing through the center O. Stated differently, the printing surface 4 is a concave surface with respect to the ink jet nozzles 2′. The nozzles 2′ are arranged in a position 5 which is in the form of an arcuate surface of a smaller radius than the printing surface 4.

Figure 4:
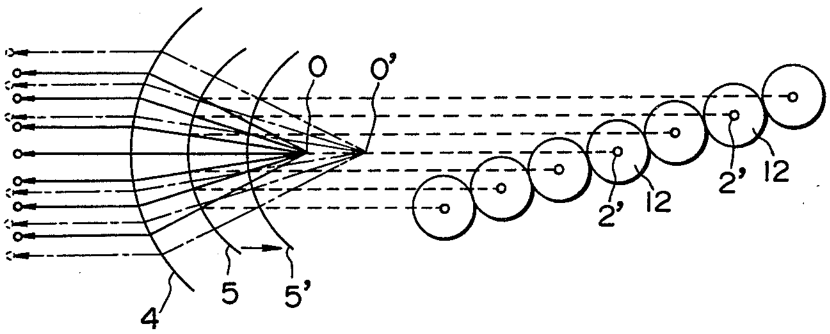
FIG. 4 is a view in explanation of a change in the spacing between dots effected by the embodiment shown in FIG. 3.

If the nozzle position 5 is moved away from the printing surface 4 to a position 5′, then the center of radiation of the ink jets ejected from the nozzles 2′ moves to a position O′ as shown in FIG. 4 and the dots formed on the printing surface 4 by the ink jets are vertically displaced in position as indicated by dash-and-dot lines, with the result that the vertical spacing between them is increased. Conversely, if the nozzle position 5 is moved toward the printing surface 4, then the vertical spacing between the dots formed on the printing surface 4 by the ink jets is reduced.

As shown in FIGS. 1 to 4, if the positions of the nozzles of the printing head or heads are set on an arc or a straight line with respect to a center and the nozzles are arranged such that the paths of flow of the ink jets ejected therefrom converge on such center or diverge from such center, it is possible to readily adjust the vertical spacing between the dots formed on the printing surface by varying the distance between the nozzles and the printing surface.

By controlling the voltage applied for driving one of the nozzles to form one dot on the printing surface, it is possible to vary the diameter of each dot on the printing surface from 150 to 300 μm or to increase nearly twofold from a minimum to a maximum value. Thus, if the diameter of the dots is varied when the vertical spacing between the dots is varied, it is possible to print characters and symbols by varying their size without distorting them.

In the embodiments shown and described hereinabove, the vertical spacing between the dots formed on the printing surface is varied by moving the position in which the nozzles are located. It is to be understood that the invention is not limited to these embodiments and that the printing surface may be varied to achieve the same results.

By synchronously effecting a change in the vertical spacing between dots according to the invention and a change in the transverse spacing between the dots according to the prior art, it is possible to effectively vary the size of characters and symbols formed by dots without distorting them.

Figure 5:
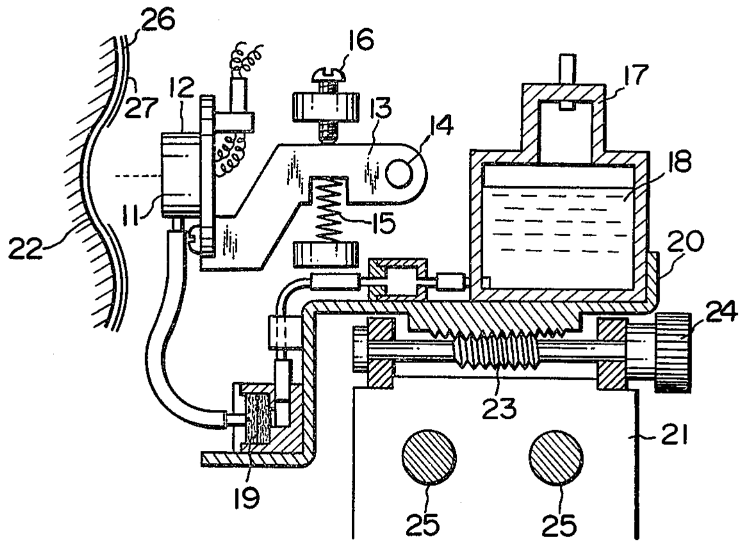
FIG. 5 is a sectional view, with certain parts being omitted, of the printing head section of an ink jet recording apparatus representing the embodiment shown in FIG. 3.

FIG. 5 shows a printing head section of an ink jet recording apparatus for carrying into practice the methods shown in FIGS. 1 and 3 for varying the vertical spacing between dots. In the figure, a printing head 12 is supported by a lever 13 for pivotal movement about a shaft 14 and has a nozzle surface 11, either arcuate or straight, on which nozzles are supported for radially ejecting ink jets from a center. The printing head 12 is supported by a frame 20 through a spring 15 and a screw 16 for adjusting the position of the printing head 12. The printing head 12 receives a supply of ink from ink 18 in an ink reservoir 17 through an ink filter 19 and a suitable conduit.

The frame 20 supporting the printing head 12 and the ink reservoir 17 is supported by a carriage 21 for movement toward or away from a printing surface 22. By turning a knob 24 connected to a distance adjusting means 23 which may be a screw, the frame 20 can be moved to thereby adjust the spacing between the printing surface 22 and the nozzle surface 11.

The carriage 21 is supported by a carriage shafts 25 for movement parallel to the printing surface 22 for scanning the same.

By adjusting the screw 16, the position of the nozzles 12 about the shaft 14 can be varied to thereby adjust the directions in which ink jets are ejected from the nozzles 12.

Figure 6:
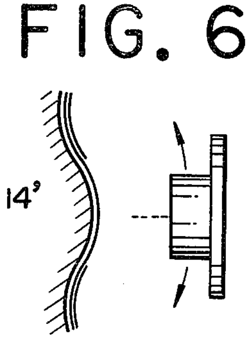
FIG. 6 is a view in explanation of the difference in the printing head section between the embodiment shown in FIG. 1 and the embodiment shown in FIG. 5.

FIG. 5 shows an embodiment in which the printing surface 22 is concave and the ink jet nozzles 12 has a convex nozzle surface as shown in FIG. 3 for printing dots on the printing surface 22 by ejecting ink from the ink jet nozzles 13. The printing surface 22 may be convex as shown in FIG. 6, and the nozzle surface 11 may be either plane or convex for supporting nozzles 12 opening in such a manner that the paths of flow of the ink jets ejected from the nozzles 12 converge on one center. The printing head 12 may be supported for pivotal movement about an imaginary center 14′ shown in FIG. 6 by a suitable supporting mechanism.

On the printing surface 22, a sheet 26 is preferably supported by a sheet support 27.

What is claimed is:

1. An ink jet recording apparatus comprising:
an ink reservoir;
printing head means provided with a plurality of ink jet nozzles connected to said ink reservoir;
a printing surface having a center of curvature for supporting a sheet thereon; and
a carriage movably supporting said printing head and said ink reservoir for movement toward and away from said printing surface;
said ink jet nozzles being arranged such that ink is ejected radially with respect to the center of curvature of the printing surface and the spacing between said printing head means and said printing surface is adjusted by movement of said carriage.

2. An ink jet recording apparatus as set forth in claim 1, wherein said printing head means comprises a plurality of printing heads each having an ink jet nozzle.

3. An ink jet recording apparatus as set forth in claim 1, wherein said ink jet nozzles are disposed on an arc which is concentric with the printing surface.

4. An ink jet recording apparatus as set forth in claim 1, wherein said ink jet nozzles are disposed on an arc approximate to an arc which is concentric with the printing surface.

5. An ink jet recording apparatus as set forth in claim 1, wherein said printing head means is supported by a lever supported by a carriage for pivotal movement about the center of curvature of the printing surface.

6. An ink jet recording apparatus as set forth in claim 1, wherein said printing head means is supported by a carriage for reciprocatory movement toward and away from the printing surface.

7. An ink jet recording apparatus for recording on a receiving sheet which includes curved surfaces, comprising sheet support means having a curved sheet receiving surface, a frame support adjacent said sheet support means, a lever pivotally mounted on said frame support, a printing head carried at one end of said lever and being shiftable upon pivoting of said lever and having a plurality of nozzles for the discharge of an ink jet therefrom toward said sheet receiving surface in respective radial parts with respect to a center of curvature of said curved sheet receiving surfaces, ink reservoir means on said frame connected to said nozzle for supplying ink thereto, adjustment means associated with said lever for pivoting said lever to vary the angle of discharge of the ink jet from said nozzle, a carriage movable along the support surface, and adjustment means on said carriage mounting said frame thereon for movement toward and away from the support surface.

8. An ink jet recording device according to claim 7 wherein the printing head includes a plurality of nozzles arranged in a row such that the path of ink jets ejected therefrom converge on a center and/or diverge from a center, and means mounting said frame for movement toward and away from the surface so as to vary the distance between the nozzles and the printing surface to vary the ink jet which is impinges on the surface from the nozzles so as to vary the size of the printed characters and symbols made by the ink jet.

9. A method of ink jet recording on a curved receiving surface using a plurality of ink jet nozzles which are arranged to direct an ink jet toward the receiving surface along radial paths from a common center comprising adjusting the vertical spacing between the dots formed on the printing surface by varying the distance between the nozzles and the printing surface.

10. A method according to claim 9 including varying the vertical spacing between the dots so as to vary the size of the symbols which are printed without distorting them.

11. A method according to claim 9 including controlling the voltage applied for driving one of the nozzles to form one dot on a printing surface so as to vary the diameter of each dot on the printing surface from 150 to 300 $\mu$m.

12. A method according to claim 9 wherein the plurality of nozzles are arranged in a vertical row and supported by a single printing head, and wherein the printing surface is formed as an inner surface of a cylindrical surface so that the printing is done over a printing surface which is concave with respect to the arrangement of the ink jet nozzles which direct the ink toward the surface.

13. A method according to claim 12 wherein the nozzles are arranged in the form of an arcuate surface of a smaller radius than the printing surface.

* * * * *